A. & J. RAISANEN.
HAY STACKER.
APPLICATION FILED OCT. 15, 1915.
1,221,375.
Patented Apr. 3, 1917.
3 SHEETS—SHEET 1.
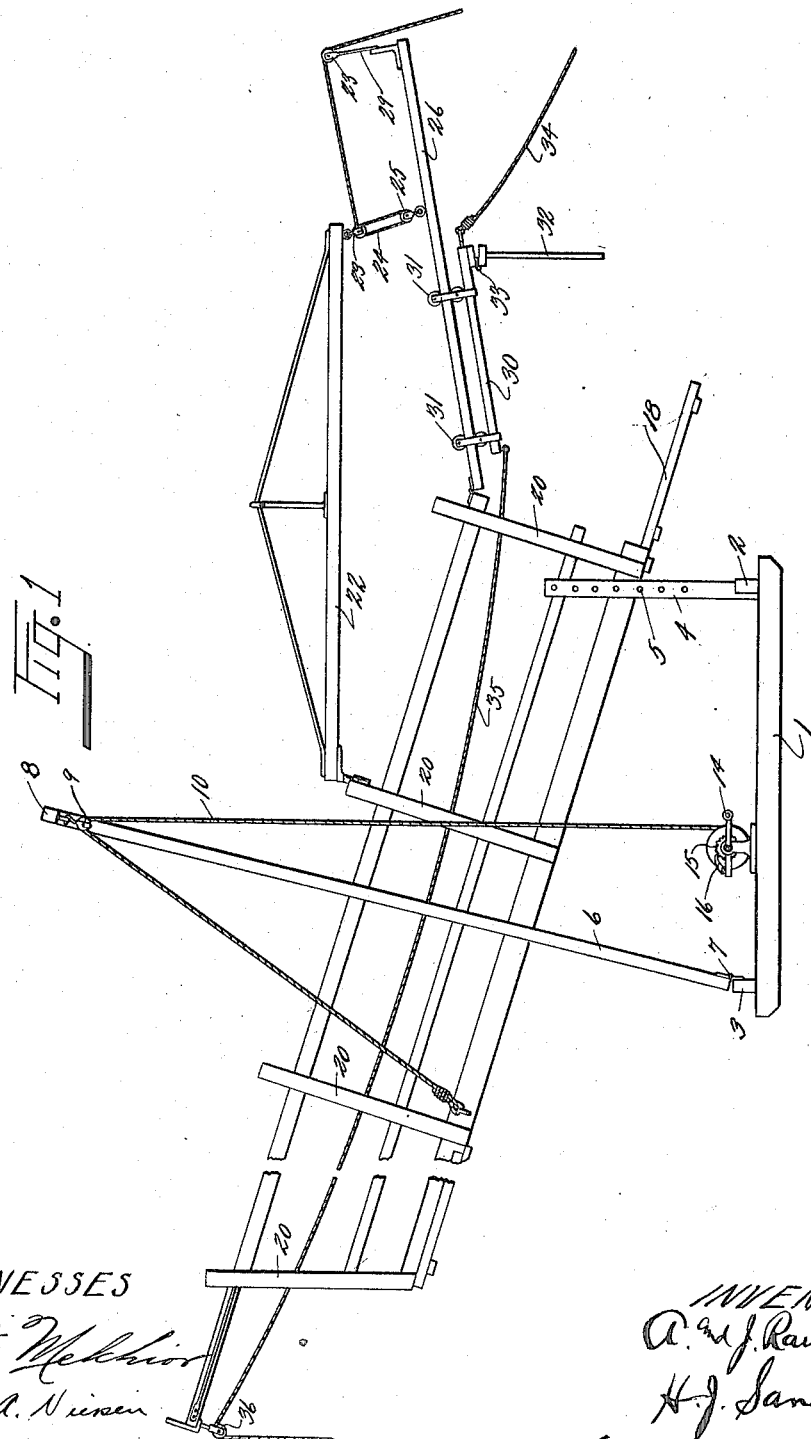

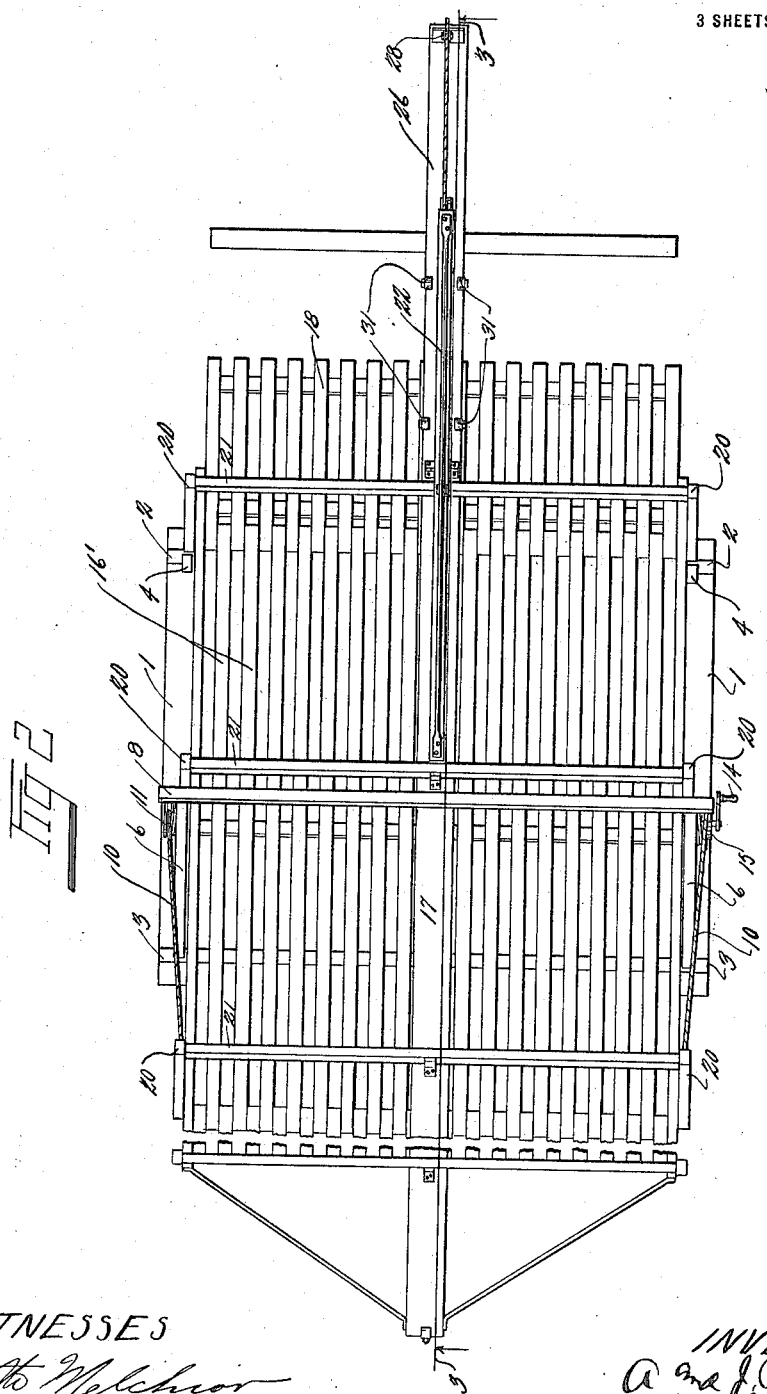

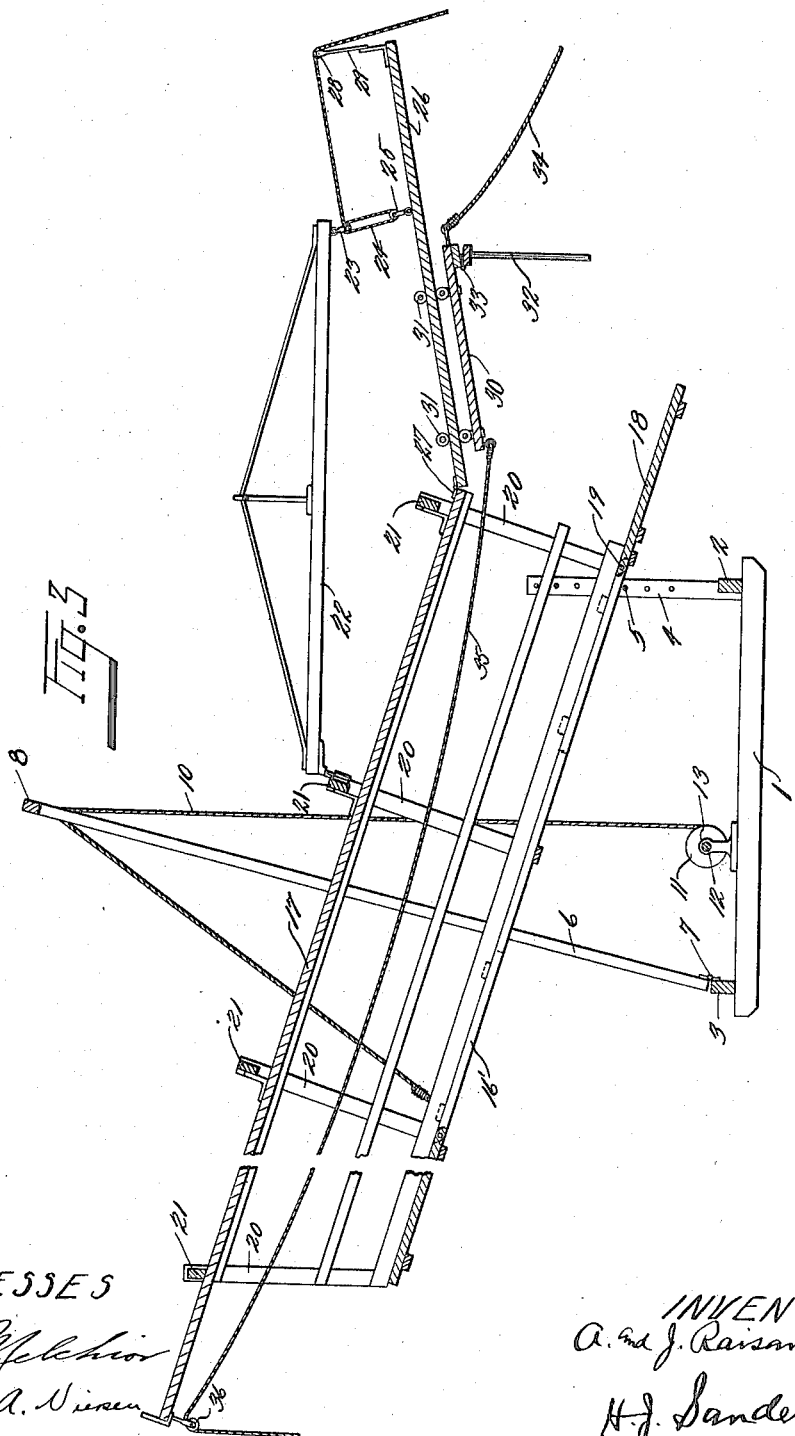

UNITED STATES PATENT OFFICE.

AUGUST RAISANEN AND JOHN RAISANEN, OF GACKLE, NORTH DAKOTA.

HAY-STACKER.

1,221,375.   Specification of Letters Patent.   Patented Apr. 3, 1917.

Application filed October 15, 1915. Serial No. 56,070.

*To all whom it may concern:*

Be it known that we, AUGUST RAISANEN and JOHN RAISANEN, citizens of Canada, residing at Gackle, in the county of Logan and State of North Dakota, have invented certain new and useful Improvements in Hay-Stackers, of which the following is a specification.

This invention relates to improvements in hay stackers and its object is to provide a hay loader having an adjustable frame so supported as to effectually withstand the vibration occasioned by the travel thereover of the hay carrier. A further object is to provide a frame which may be instantly adjusted to facilitate the travel of the hay fork thereover thus reducing to the minimum the amount of work to be performed by the operators. With the foregoing and other objects in view the invention consists in the combination and arrangement of parts to be hereinafter fully described in the following specification, pointed out in the claim and illustrated in the accompanying drawings which form a part of said specification and in which—

Figure 1 is a side elevation of our improved hay stacker.

Fig. 2 is a plan view of the same.

Fig. 3 is a longitudinal sectional view taken on line 3—3 of Fig. 2.

Like reference characters indicate corresponding parts throughout the several views.

The reference numeral 1 denotes the skids which are connected by bars 2, 3 and to the cross bar 2 uprights 4 are secured that are connected by a removable rod 5 adapted for insertion in apertures in the uprights 4. To the cross bar 3 masts 6 are hinged as at 7, said masts being connected at their top ends by a beam 8 which carries pulleys 9 over which cables 10 pass that at one end are wound about drums 11 loose upon a shaft 12 journaled in bearings 13 secured to the skids 1, said shaft being provided with a handle 14 and with a ratchet 15 fast thereon and which is engaged by a gravity pawl 16 carried by one drum to normally arrest rotation in one direction. The cables 10 aforesaid are connected to a frame 16' which is provided with a runway 17 and at one end with a tail board 18 secured thereto by a hinge 19. To braces 20 which support the runway, cross pieces 21 are secured, one of which carries one end of the bridge 22 which at its free end supports pulleys 23 over which cord 24 passes that also passes over a pulley 25 secured to an extension 26 of the runway 17, said runway and extension being connected by the hinge 27. The cord 24, further extends over a sheave 28 carried at the end of an arm 29 secured to the free end of the runway extension and said cord is used to raise and lower said runway extension with relation to the runway proper.

A fork carriage 30 is provided with rollers 31 adapted to ride upon the runway and runway extension, said fork carriage being provided with the fork 32 which is connected thereto by hinge 33. The said fork carriage may be manually moved over the runway and runway extension in one direction by means of cord 35 passing over a sheave 36 carried by the runway. In use the fork carriage is drawn out over the runway extension to the wagon or stack the line 24 being brought into requisition. The fork is driven into the hay in the usual manner and the free end of the runway extension may then be raised to cause the fork carriage to gravitate to the runway proper by suitably pulling upon the cord 24. One end of the frame 16' is supported upon one of the cross rods 5 and the opposite end thereof is raised or lowered by winding in or paying out the cables 10. The fork carriage may now be caused to travel over the runway proper by lowering the same gradually until gravitation will actuate it.

What is claimed is:—

A device of the type described, including a tiltably-supported frame, having a runway supported thereon, said runway extending longitudinally thereof and itself having a tiltable extension, a bridge having one end supported upon said frame, distantly, and inwardly, from one end of the frame, the opposite end of said bridge overhanging said tiltable extension and means effecting connection between said bridge and said extension and providing for the tilting of the latter, said tiltable extension having mounted thereon a fork-equipped carriage, for travel upon said runway and its tiltable extension.

In testimony that we claim the foregoing as our own we have hereto affixed our signatures in the presence of two subscribing witnesses.

AUGUST RAISANEN.
JOHN RAISANEN.

Witnesses:
R. S. MILLER,
JOE. WATSON.